W. R. GATES.
SAW CLAMP.
APPLICATION FILED JAN. 29, 1910.
964,508.
Patented July 19, 1910.
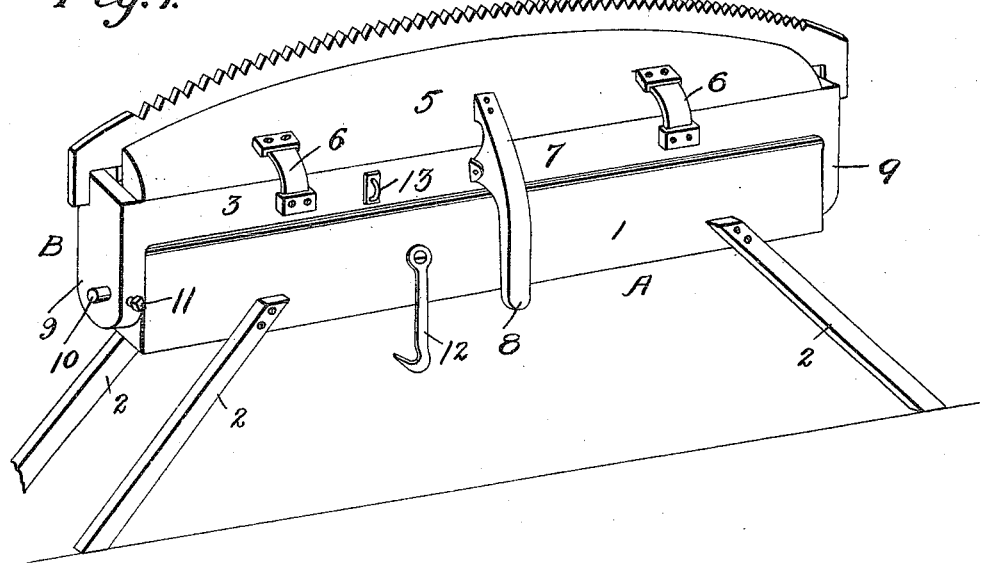
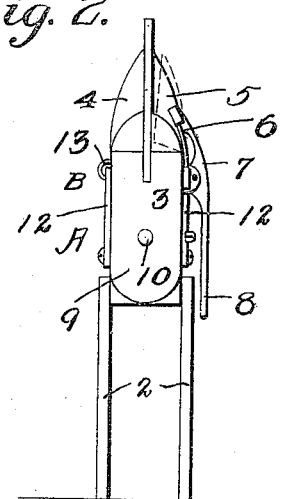
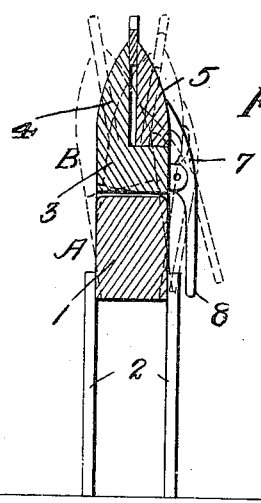
Witnesses
Jos. F. Collins,
S. E. Dodge.
Inventor
W. R. Gates,
By Beeler & Robb
Attorneys

UNITED STATES PATENT OFFICE.

WILLIAM R. GATES, OF WINNFIELD, LOUISIANA, ASSIGNOR OF ONE-HALF TO H. Z. GATES, OF WINNFIELD, LOUISIANA.

SAW-CLAMP.

964,508.  Specification of Letters Patent.  Patented July 19, 1910.

Application filed January 29, 1910. Serial No. 540,875.

*To all whom it may concern:*

Be it known that I, WILLIAM R. GATES, a citizen of the United States, residing at Winnfield, in the parish of Winn and State of Louisiana, have invented certain new and useful Improvements in Saw-Clamps, of which the following is a specification.

This invention consists of a novel form of saw clamp and stand designed particularly to facilitate the operation of sharpening, setting, or otherwise operating upon the teeth of saws.

The invention involves especially the peculiar construction of stand and the clamping means mounted thereon for supporting the saw for the purposes above referred to.

For a full understanding of the invention, reference is to be had to the following detail description and the accompanying drawings, in which—

Figure 1 is a perspective view of a device embodying the invention; Fig. 2 is an end elevation, dotted lines showing the movable jaw of the saw clamp open, and Fig. 3 is a vertical central section, the clamp carrier being shown in dotted lines in adjusted positions.

Throughout the following detail description and on the several figures of the drawings, similar parts are referred to by like reference characters.

Specifically describing the invention, and referring particularly to the drawings A denotes the stand for the saw clamp, said stand comprising a top 1 and supporting legs 2. The saw clamp B is arranged above the stand A and comprises a carrier 3 by which the jaws of the clamp are supported. The carrier 3 consists of a longitudinal bar with which is formed a rigid jaw 4 arranged adjacent to a movable jaw 5. The jaw 5 is connected with the carrier 3 by means of springs 6 attached at opposite ends to the said jaw and carrier respectively, and normally tending to hold the jaw 5 against the jaw 4. Pivoted between its ends to the carrier 3 is a lever 7, said lever being connected at its upper end with the jaw 5 and having its lower end projected outwardly and downwardly to provide a handle 8 adapted to be readily grasped by the operator in order to impart pivotal movement to the jaw 5 and thus separate the same from the jaw 4 preparatory to placing a saw between said jaws. At its opposite ends the carrier 3 is provided with downwardly extending arms 9 having openings receiving journals 10 projecting outwardly from the opposite ends of the top 1 of the stand. The carrier 3 of the clamp is thus pivotally connected with the top 1 of the stand A and set screws 11 are applied to the arms 9 and arranged so as to engage the journals 10 in order to hold the carrier 3 at any desired angular adjustment, such as shown in dotted lines in Fig. 3, to facilitate sharpening of the cutting teeth of the saw.

When the drag teeth of a saw are being operated upon it is desirable that the carrier 3 be held rigidly in a vertical position such as shown in Fig. 1, and for the above purpose hooks 12 are pivoted to opposite sides of the top 1 of the stand A and said hooks are adapted to engage in loops 13 upon opposite sides of the body of the carrier 3, to thereby rigidly position the carrier when it is desired that the clamp be held in an upright position. It will be observed that the hooks 12 may be readily disengaged from the members 13 whenever angular adjustment of the clamp B is desired, such angular adjustment being admitted of by reason of the pivotal mounting of the carrier 3 on the top 1 of the stand A, and the set screws 11 being employed to hold the clamp at suitable angular adjustments as may be most desirable for the purposes of the invention.

The invention is comparatively simple in construction and affords a very convenient and rigid clamping device for supporting a saw while operating upon the teeth of the same.

Having thus described the invention, what is claimed as new, is:

In a device of the class described, the combination of a stand consisting of a top and supporting legs, a carrier mounted thereon, arms projecting downwardly from opposite ends of the carrier and journaled to opposite ends of the stand, the carrier being formed with a rigid jaw projecting upwardly therefrom, a movable jaw projected at one side of the rigid jaw, springs connecting the movable jaw and the carrier and normally holding the jaws together, a lever pivoted to the carrier and connected with the movable jaw for operation thereof, hooks pivoted to opposite sides of the stand, and members carried by opposite sides of the carrier for engagement with said hooks to hold the clamp rigidly in a vertical position.

In testimony whereof I affix my signature in presence of two witnesses.

WILLIAM R. GATES.

Witnesses:
L. O. DAMMON,
ROBERT BRADFORD.